Sept. 22, 1936.　　　　A. J. HACKMAN　　　　2,055,347
REMOTE CONTROL OPERATING MECHANISM
Filed Aug. 17, 1934
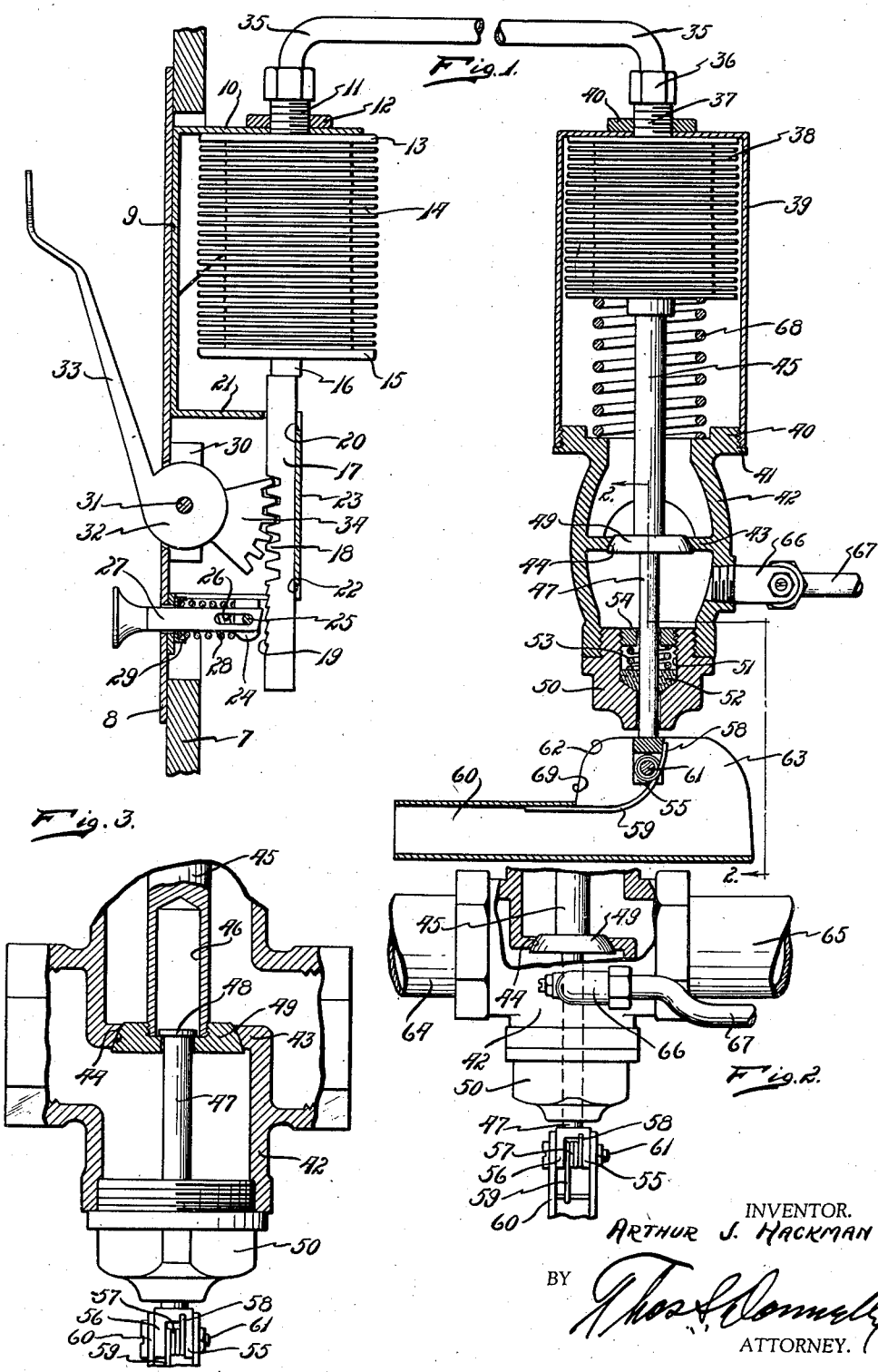

UNITED STATES PATENT OFFICE 2,055,347

REMOTE CONTROL OPERATING MECHANISM

Arthur J. Hackman, Detroit, Mich.

Application August 17, 1934, Serial No. 740,242

2 Claims. (Cl. 137—139)

My invention relates to a new and useful improvement in a remote control operating mechanism adapted for use in operating, from a distant point, a control valve in a pressure line such as a water or gas line.

It is an object of the present invention to provide a mechanism of this class embodying a pair of collapsible bellows operating in unison with each other but opposite in their movements so that upon the collapsing of one the other will be expanded.

Another object of the invention is the provision in a mechanism of this class of releasable means for locking the actuating bellows in collapsed position to retain the operating bellows in valve opening position.

Another object of the invention is means for manually operating the valve independently of the actuating bellows.

Another object of the invention is the provision of means for manually releasing, in proximity to the operating bellows, the actuating bellows for movement to non-actuating position.

Other objects will appear hereinafter.

The invention consists in the combination and arrangement of parts hereinafter described and claimed.

The invention will be best understood by a reference to the accompanying drawing which forms a part of this specification and in which is, Fig. 1 is a side elevational view of the actuating mechanism and a longitudinal central sectional view of the operating mechanism.

Fig. 2 is a fragmentary sectional view taken on line 2—2 of Fig. 1.

Fig. 3 is a fragmentary sectional enlarged view similar to Fig. 2.

In the drawing I have illustrated the invention in a manner in which the actuating mechanism is mounted on a suitable support 7. In the form shown in the drawing I have illustrated the invention used to control a gas valve from which leads a pipe to a pilot light. The invention thus illustrated is adapted for use in controlling gas burners such as hot water heaters and the like. Mounted on the support 7 is the retaining plate 8. Secured to the retaining plate 8 is a bracket 9 having the upper horizontal support portion 10 through which projects the pipe 11 and onto which is threaded the nut 12. This pipe 11 connects with the end plate 13 of the actuating bellows 14 which is provided at its opposite end with the end plate 15. Secured to this end plate 15 centrally thereof is a stud 16 attached to which is a rack bar 17 provided with rack teeth 18 and having on its lower portion the serrations 19. It will be noted that these serrations 19 do not extend to the end of the rack bar 17 and the purpose of this will appear as the description proceeds. This rack bar extends through the opening 20 formed in the supporting bracket 21 and through the opening 22 formed in this supporting bracket, the upper and lower portions of the supporting bracket being connected by the plate 23. Projecting downwardly from the lower bracket are supporting lugs 24 through which project a pin 25. This pin extends through the slot 26 formed in the locking plunger 27, this plunger projecting through the plate 8. A spring 28 embraces the plunger 27 and engages at one end the lugs 24 and at the opposite end a collar 29 which is fixedly mounted on the plunger 27.

Mounted on the inner surface of the plate 8 are supporting lugs 30 between which is pivotally mounted, by means of the pin 31, the head 32 which carries the operating handle or lever 33. Formed on this head 32 is a segment 34 having teeth meshing with the teeth 18.

The construction is such that as the lever 33 is rocked downwardly so as to rock the segment 34 upwardly the bellows 14 will be collapsed. When the rack bar 17 is moved upwardly it may be locked in its upwardly moved position so as to retain the bellows 14 in collapsed condition by means of the plunger 27 which may be pushed inwardly against the compression of the spring 28 so that the end of the plunger will engage the serrations 19. It is obvious that after the end of the plunger has engaged these serrations a further collapsing of the bellows would move the rack bar upwardly so that the downward pressure of the serrations on the end of the plunger would be relieved. When this would happen the spring 28 would function to thrust the plunger outwardly out of engagement with the serrations. The device is so constructed that when the bellows 14 is collapsed to normal operative position the plunger will engage the lowermost serration to retain the bellows locked in collapsed position. Consequently should the bellows be further collapsed so as to raise the rack bar upwardly the portion free from serrations would be positioned opposite the plunger thus permitting a complete disengagement of the plunger from the serrated position and assuring a withdrawal of the plunger by the spring 28.

A delivery pipe 35 is connected in communication with the pipe 11 so as to communicate with the interior of the bellows 14. This pipe 35 is connected by the nut 36 to the pipe 37 which is secured to and in communication with the interior of the operating bellows 38. This operating bellows 38 is enclosed in a gas-tight housing 39 through the upper side of which the pipe 37 projects. A nut 40 threaded on this pipe 39 serves to bind the bellows and housing in rigid relation to each other.

The lower end of the housing 39 is threaded on the peripherally threaded sleeve 40 which projects upwardly from the flange 41 formed on the valve housing 42. A valve seat 43 is formed on the inner surface of the housing 42 and provided with the face 44 against which the valve head 49 is adapted to engage. Secured to the lower end of the bellows 38 is the rod or valve stem 45 which is formed at its lower end hollow to provide the space 46 into which may be extended the end of the valve stem extension 47 which is provided with the flange or head 48. This valve stem extension projects through the valve head 49 which is threaded onto the lower end of the stem or rod 45 so that the head 48 is locked in the space 46 and the stem 47 may move longitudinally of the stem 45 within certain limits. An end piece 50 is threaded into the lower end of the housing 42 to form a closure therefor. This end piece is provided with a pocket 51 in which is positioned packing 52 around the valve stem extension 47 which projects through the end piece 50. A spring 53, held in position by the nut 54, serves to retain this packing in sealing relation to the stem extension 47.

The lower end of the stem extension 47 is provided with a yoke between the arms 55 and 56 of which is positioned a coil spring 57, one end 58 of which engages the yoke and the other end 59 of which engages the handle 60 which is pivotedly mounted by means of the bolt 61 of the yoke which is supported by the valve handle extension 47. This stem 60 carries a head so as to provide the cams 62 and 63 at opposite sides of its mounting on the bolt 61.

An inlet pipe 64 communicates with the valve housing at one side of the valve head 49 and an outlet pipe 65 communicates at the opposite end. A fitting 66 communicates with the housing and connected to this fitting is a small pipe 67 which will serve as a bleed pipe to communicate with a pilot light or the like.

In use the bellows 14 and 39 as well as the line 35 are filled with a gas or liquid. I prefer to use a liquid for practical operations although any fluid would serve to function so long as the fluid were not too susceptible to changes resulting from temperature changes. The actuating mechanism embodying the bellows 14 and the associated parts shown in Fig. 1 would be mounted at some convenient place where it is desired that the valve in the housing 42, located at a distance may be operated. When the bellows are filled with the necessary fluid a downward rocking of the lever 33 will effect the compressing of the bellows 14 and this will result in an expansion of the bellows 39 against the compression of the spring 68. This will move the valve head off of its seat. The operator, while pressing the lever 33 downwardly, may force the plunger 27 inwardly into engagement with the serrations 19 so that, upon a release of the handle 13, the rack bar 17 will be held in the position to which it was moved, thus retaining the various parts in position to retain the valve in open position. In order to effect a closing of the valve the lever 33 may be rocked further downwardly so that the plunger 27 will be released for movement rearwardly into unlocking position whereupon a releasing of the pressure on the lever 33 would permit the bellows to move into the position shown in Fig. 1. In this movement the spring 68 would function to collapse the bellows 38 and to retain the valve closure seated on its seat. The handle 60 provides a means for opening the valve without using the actuating mechanism. In order to open the valve with the handle 60 it would be necessary to rock the same on its pivot so that the cam 62 would engage the end piece 50 and thus serve to move the valve stem extension 47 longitudinally sufficiently to move the valve off of its seat. The comparatively flat surface 69 would also serve to lock this handle in position to retain the valve off of its seat.

The cam 63 is provided so that after the valve has been moved to open position by means of the lever 33 the handle 60 may also be used to close the valve or to release the plunger 27. When the valve is moved to open position by the cam 62 the bellows 38 would not be completely expanded but would be moved to that position of expansion that it would be moved to were the valve to be opened through the actuating mechanism by the locking of the lever 33. Consequently were the valve to be opened by the lever 33 a rocking of the handle 60 to bring the cam 62 into engagement with the member 50 would not move the bellows 38 to a further degree of expansion and therefore no movement would be transmitted to the rack bar 17. When the valve is opened by means of the lever 33 and the handle 60 is locked so as to bring the cam 63 into engagement with the member 50 the valve stem extension will be moved longitudinally to effect a further expansion of the bellows 39 and thus cause the rack bar 17 to move upwardly so that the plunger 27 will not be in engagement with the serrations and the spring 28 may function to withdraw this plunger. Consequently by locking the handle 60 to bring into function the cam 63 the locking plunger 27 is thereby released and then the valve may be closed by returning the handle 60 to the position shown in Fig. 1. Due to the fact that the valve stem extension passes through the packing 52 it is desirable to retain this packing in a sealing condition. It is also desirable that the wear on the packing be reduced to a minimum. In a normal operation of such a device the valve will usually be opened and closed through a manipulation of the lever 33. When the valve is so operated, on account of the floating connection between the valve stem extension 47 and the rod 45, a sliding of the valve stem extension 47 in its packing will be reduced to a minimum and effected only when the handle 60 is operated.

With a device of this kind I have provided a bellows operated remote control which is very simple in its structure and economical of manufacture. It is believed that the compactness of the device will also appear from the description.

While I have illustrated and described the preferred form of construction I do not wish to limit myself to the precise details of structure shown but desire to avail myself of such variations and modifications as come within the scope of the appended claims.

Having thus described my invention, what I claim as new and desire to secure by Letters Patent is:

1. In combination, a valve; a collapsible bellows adapted upon expansion for moving said valve to open position and upon collapsing for moving said valve to closed position; means for normally maintaining said bellows collapsed; an actuating bellows; a conduit for establishing communication between said bellows; means for effecting a collapsing of said actuating bellows for forcing fluid therefrom through said conduit into said first mentioned bellows for expanding the same; releasable means for locking said actuating bellows in collapsed position; and a manually operable means, accessible from adjacent said valve, for effecting a further collapse of said actuating bellows subsequent to its normal collapse and releasing said locking means.

2. In combination, a valve; a collapsible bellows adapted upon expansion for moving said valve to open position and upon collapsing for moving said valve to closed position; means for normally maintaining said bellows collapsed; an actuating bellows; a conduit for establishing communication between said bellows; means for effecting a collapsing of said actuating bellows for forcing fluid therefrom through said conduit into said first mentioned bellows for expanding the same; releasable means for locking said actuating bellows in collapsed position; and means, accessible from adjacent said valve, for effecting a further collapse of said actuating bellows subsequent to its normal collapse and releasing said locking means.

ARTHUR J. HACKMAN.